United States Patent
Pires Fortes Ferreira et al.

(10) Patent No.: US 12,479,985 B2
(45) Date of Patent: *Nov. 25, 2025

(54) PROCESSES FOR PRODUCING POLYETHYLENE CONTAINING RECYCLED NON-POLAR POLYMERIC MATERIAL

(71) Applicant: NOVA CHEMICALS (INTERNATIONAL) S.A., Fribourg (CH)

(72) Inventors: Marcia Pires Fortes Ferreira, Calgary (CA); Marzieh Ebrahimi, Calgary (CA); Renee Anseeuw, Calgary (CA); Graham Lee, Calgary (CA); Gurpreet Kooner, Calgary (CA); Fazle Sibtain, Calgary (CA)

(73) Assignee: NOVA Chemicals (International) S.A., Fribourg (CH)

( * ) Notice: Subject to any disclaimer, the term of this patent is extended or adjusted under 35 U.S.C. 154(b) by 835 days.

This patent is subject to a terminal disclaimer.

(21) Appl. No.: 17/785,328

(22) PCT Filed: Dec. 11, 2020

(86) PCT No.: PCT/IB2020/061840
§ 371 (c)(1),
(2) Date: Jun. 14, 2022

(87) PCT Pub. No.: WO2021/124054
PCT Pub. Date: Jun. 24, 2021

(65) Prior Publication Data
US 2023/0035963 A1    Feb. 2, 2023

Related U.S. Application Data

(60) Provisional application No. 62/951,356, filed on Dec. 20, 2019.

(51) Int. Cl.
| | |
|---|---|
| *C08L 23/08* | (2025.01) |
| *C08F 2/01* | (2006.01) |
| *C08F 2/14* | (2006.01) |
| *C08F 210/16* | (2006.01) |
| *C08L 23/0807* | (2025.01) |
| *C08J 3/00* | (2006.01) |

(52) U.S. Cl.
CPC ............ *C08L 23/0815* (2013.01); *C08F 2/01* (2013.01); *C08F 2/14* (2013.01); *C08F 210/16* (2013.01); *C08J 3/005* (2013.01); *C08J 2400/30* (2013.01); *C08J 2423/06* (2013.01); *C08J 2423/08* (2013.01); *C08L 2205/025* (2013.01); *C08L 2207/20* (2013.01)

(58) Field of Classification Search
CPC ........ C08F 210/16; C08F 210/14; C08F 2/44; C08F 2/14; C08F 2/34; C08L 23/0815; C08L 23/06
See application file for complete search history.

(56) References Cited

U.S. PATENT DOCUMENTS

| | | | |
|---|---|---|---|
| 8,609,778 B1 | 12/2013 | Frost et al. | |
| 2013/0053461 A1 | 2/2013 | Alidedeoglu et al. | |
| 2017/0107364 A1* | 4/2017 | Trolez | .................... C08L 23/06 |
| 2018/0305530 A1* | 10/2018 | Wang | ......................... C08J 5/18 |
| 2018/0305531 A1* | 10/2018 | Zhang | ........................ C08J 5/18 |
| 2023/0045215 A1* | 2/2023 | Clavelle | ............. C08L 23/0815 |

FOREIGN PATENT DOCUMENTS

| | | |
|---|---|---|
| EP | 3 331 950 B1 | 10/2019 |
| WO | WO-2013/033285 A1 | 3/2013 |
| WO | WO-2015/169690 A1 | 11/2015 |
| WO | WO-2016/005265 A1 | 1/2016 |

OTHER PUBLICATIONS

International Search Report & Written Opinion of the International Searching Authority issued in PCT Application No. PCT/IB2020/061840, mailed Apr. 12, 2021.

* cited by examiner

*Primary Examiner* — Eli D. Strah
(74) *Attorney, Agent, or Firm* — Thomas J. Styslinger

(57) ABSTRACT

Disclosed herein are processes for producing blends of recycled polymeric material and virgin polyethylene. Post-consumer recycled plastic (PCR) can vary widely with respect to composition which includes mixtures of variable amounts of different polar and non-polar polymers such as polyethylene, polypropylene, ethylene vinyl alcohol, and polyamide. Mixing PCR and virgin polyethylene is inconsistent, partially due to variability, and frequently results in a final product with poor mechanical and optical properties. The process described herein of adding PCR to a solution polymerization process provides another option for blending PCR and virgin polyethylene that offers an ability to exert greater control on the properties of the final product, independent of the composition of the PCR.

20 Claims, No Drawings

PROCESSES FOR PRODUCING POLYETHYLENE CONTAINING RECYCLED NON-POLAR POLYMERIC MATERIAL

CROSS REFERENCE TO RELATED APPLICATIONS

This application is a U.S. National Phase Application under 35 U.S.C. § 371 of International Application No. PCT/IB2020/061840, filed Dec. 11, 2020, which claims the benefit of priority to U.S. Provisional Application No. 62/951,356, filed Dec. 20, 2019, all of which are hereby incorporated by reference in their entirety.

TECHNICAL FIELD

Provided in this disclosure are polymerization processes where recycled polymeric material is fed to polymerization process to produce a blend of virgin polymer with recycled polymeric content.

BACKGROUND ART

Use of recycled plastic is of commercial interest as consumers demand retailers provide products in containers made partially or entirely of recycled plastic. Packaging manufacturers and polymer resin manufacturers need to work with brand owners to ensure these demands can be met. Recycled polymeric materials are available in a variety of forms ranging from waste materials produced and collected at the point of manufacture to commercially available post-consumer recycled streams. The composition of available streams of recycled plastic can vary because the goods being recycled include mixtures of polar and/or non-polar materials including, but not limited to, polyethylene (PE), polypropylene homopolymer (hPP), PP impact copolymers (ICP-PP), polypropylene random copolymer (rPP), polyethylene terephthalate (PET), ethylene vinyl alcohol (EVOH), polyamide (PA), and grafted polyolefins (gPO).

Incorporation of recycled plastic into second and third use products remains a challenge technically, commercially, and financially.

SUMMARY OF INVENTION

Provided in this disclosure is a continuous polymerization process for the preparation of a polyethylene polymer blend product that includes a virgin polyethylene and a recycled non-polar polymer. The process is useful for the incorporation of recycled plastic into second and third use products, including for example, compositions including mixtures of non-polar post-consumer recycled plastic and polyethylene polymer formulations.

An embodiment of the disclosure is a continuous polymerization process that includes preparing a slurry of recycled non-polar polymer in a non-polar solvent, providing the slurry of recycled non-polar polymer, ethylene, and optionally at least one C4 to C10 alpha-olefin comonomer, to a continuous polymerization reactor in the presence of a first catalyst system, operating the continuous polymerization reactor under standard solution polymerization conditions to produce a first polyethylene polymer blend product including polyethylene and the recycled non-polar polymer, and discharging the first polyethylene polymer from the continuous polymerization reactor.

In an embodiment, the discharged first polyethylene polymer blend product is provided to a second continuous polymerization reactor in the presence of a second catalyst system, and operating the second continuous polymerization reactor under standard solution polymerization conditions to produce a second polymer blend product, which is discharged from the second continuous polymerization reactor.

In an embodiment, the discharged the second polyethylene polymer blend product and optionally ethylene are directed into a tubular reactor and subjected to polymerization conditions in the presence of a second catalyst system to produce a final polyethylene polymer blend product, which is discharged from the tubular reactor.

An embodiment of the disclosure is a continuous polymerization process for the preparation of a polyethylene polymer blend product, the polyethylene polymer blend product including a blend of a virgin polyethylene and a recycled polyethylene, in at least one polymerization reactor, wherein the continuous polymerization process includes preparing a slurry of recycled non-polar polymer in a solvent, providing ethylene and, optionally, at least one C4 to C10 alpha-olefin comonomer, to a continuous polymerization reactor in the presence of a first catalyst system, operating the continuous polymerization reactor under standard solution polymerization conditions to produce a first polyethylene product, discharging the first polyethylene product from the continuous polymerization reactor, providing the first polyethylene, the slurry of recycled non-polar polymer, ethylene and, optionally, at least one C4 to C10 alpha-olefin comonomer, to a second continuous polymerization reactor in the presence of a second catalyst system, operating the second continuous polymerization reactor under standard solution polymerization conditions to produce a first polyethylene polymer blend product including the first polyethylene product and the recycled non-polar polymer, and discharging the first polyethylene polymer blend product from the second continuous polymerization reactor.

In an embodiment, the first polyethylene polymer blend product and ethylene are provided into a tubular reactor and subject to polymerization conditions resulting in additional polyethylene polymerization to produce a final polyethylene polymer blend product which is discharged from the tubular reactor.

An embodiment of the disclosure is a continuous polymerization processes for the preparation of a polyethylene polymer blend product, the polyethylene polymer blend product including a blend of a virgin polyethylene and a recycled non-polar polymer, in at least one polymerization reactor, wherein the continuous polymerization process includes preparing a slurry of recycled non-polar polymer in a solvent, providing ethylene and, optionally, at least one C4 to C10 alpha-olefin comonomer, to a continuous polymerization reactor in the presence of a first catalyst system, operating the continuous polymerization reactor under standard solution polymerization conditions to produce a first polyethylene product, discharging the first polyethylene product from the continuous polymerization reactor, providing the first polyethylene product, ethylene and, optionally, at least one C4 to C10 alpha-olefin comonomer, to a second continuous polymerization reactor in the presence of a second catalyst system, operating the second continuous polymerization reactor under standard solution polymerization conditions, to produce a second polyethylene product, discharging the second polyethylene product from the second continuous polymerization reactor, providing the second polyethylene, and the slurry of recycled non-polar polymer to a tubular reactor, and discharging from the tubular reactor a final polyethylene polymer blend product.

An embodiment of the disclosure is a continuous polymerization processes for the preparation of a polyethylene polymer blend product, the polyethylene polymer blend product including a blend of a virgin polyethylene and a recycled non-polar polymer, in a continuous polymerization reactor, wherein the continuous polymerization process includes preparing a slurry of recycled non-polar polymer in a solvent, providing ethylene and, optionally, at least one C4 to C10 alpha-olefin comonomer, to a continuous polymerization reactor in the presence of a catalyst system, operating the continuous polymerization reactor under standard solution polymerization condition to produce a polyethylene polymer, discharging the polyethylene polymer from the continuous polymerization reactor, and combining the slurry of recycled non-polar polymer with the discharged polyethylene polymer to producing a polyethylene polymer blend product including polyethylene and the recycled polyethylene.

DESCRIPTION OF EMBODIMENTS

Definitions

As used herein, the phrase "leaving group" generally refers to one or more chemical moieties bound to the metal center of the catalyst compound that can be abstracted from the catalyst compound, thus producing a species active towards olefin polymerization or oligomerization.

As used herein, in reference to Periodic Table "Groups" of Elements, the "new" numbering scheme for the Periodic Table Groups are used as in the CRC Handbook of Chemistry and Physics (David R. Lide ed., CRC Press 81st ed. 2000).

The term "amido" is meant to convey its broad, conventional meaning. Thus, these ligands are characterized by (a) a metal-nitrogen bond; and (b) the presence of two substituents (which are typically simple alkyl or silyl groups) on the nitrogen atom.

As used herein, a "hydrocarbyl" includes aliphatic, cyclic, olefinic, acetylenic and aromatic radicals (i.e. hydrocarbon radicals) including hydrogen and carbon that are deficient by one hydrogen. A "hydrocarbylene" is deficient by two hydrogens.

As used herein, an "alkyl" includes linear, branched and cyclic paraffin radicals that are deficient by one hydrogen. Thus, for example, a —CH3 group ("methyl") and a CH3CH2- group ("ethyl") are examples of alkyls.

As used herein, an "alkenyl" includes linear, branched and cyclic olefin radicals that are deficient by one hydrogen; alkynyl radicals include linear, branched and cyclic acetylene radicals deficient by one hydrogen radical.

As used herein, "aryl" groups includes phenyl, naphthyl, pyridyl and other radicals whose molecules have the ring structure characteristic of benzene, naphthylene, phenanthrene, anthracene, etc. For example, a C6H5-aromatic structure is a "phenyl", a C6H42-aromatic structure is an "phenylene". An "arylalkyl" group is an alkyl group having an aryl group pendant there from, examples of which include benzyl, phenethyl, tolylmethyl and the like; an "alkylaryl" is an aryl group having one or more alkyl groups pendant there from, examples of which include tolyl, xylyl, mesityl, cumyl and the like.

The terms "alkoxy" and "aryloxy" are also intended to convey their conventional meanings. Thus, these ligands are characterized by (a) a metal oxygen bond; and (b) the presence of a hydrocarbyl group bonded to the oxygen atom. The hydrocarbyl group may be a C1-10 straight chained, branched or cyclic alkyl radical or a C6-13 aromatic radical where the radicals are unsubstituted or further substituted by one or more C1-4 alkyl radicals (e.g. 2,6 di-tertiary butyl phenoxy).

As used herein, an "alkylene" includes linear, branched, and cyclic hydrocarbon radicals deficient by two hydrogens. Thus, —CH2- ("methylene") and —CH2CH2- ("ethylene") are examples of alkylene groups. Other groups deficient by two hydrogen radicals include "arylene" and "alkenylene".

As used herein, the phrase "heteroatom" includes any atom other than carbon and hydrogen that can be bound to carbon. A "heteroatom-containing group" is a hydrocarbon radical that contains a heteroatom and may contain one or more of the same or different heteroatoms. In one embodiment, a heteroatom-containing group is a hydrocarbyl group containing from 1 to 3 atoms chosen from boron, aluminum, silicon, germanium, nitrogen, phosphorous, oxygen and sulfur. Non-limiting examples of heteroatom-containing groups include radicals of imines, amines, oxides, phosphines, ethers, ketones, oxoazolines heterocyclics, oxazolines, thioethers, and the like.

As used herein, "heterocyclic" refers to ring systems having a carbon backbone that include from 1 to 3 atoms chosen from boron, aluminum, silicon, germanium, nitrogen, phosphorous, oxygen and sulfur, unless the heteroatom (non-carbon atom) is described.

As used herein, an "alkylcarboxylate", "arylcarboxylate", and "alkylarylcarboxylate" is an alkyl, aryl, and alkylaryl, respectively, that possesses a carboxyl group in any position. Examples include C6H5CH2C(O)O—, CH3C(O)O—, etc.

As used herein, "non-interfering" means that the ligand (or cation) being referred to does not interfere with olefin polymerization (i.e. that it does not reduce the activity of olefin polymerization by more than 50% in comparison to a polymerization conducted in the absence of the ligand or cation).

As used herein, the term "substituted" means that the group following that term possesses at least one moiety in place of one or more hydrogens in any position, the moieties selected from such groups as halogen radicals (for example Cl, F, Br), hydroxyl groups, carbonyl groups, carboxyl groups, amine groups, phosphine groups, alkoxy groups, phenyl groups, naphthyl groups, C1 to C10 alkyl groups, C2 to C10 alkenyl groups, and combinations thereof. Examples of substituted alkyls and aryls includes, but are not limited to, acyl radicals, alkylamino radicals, alkoxy radicals, aryloxy radicals, alkylthio radicals, dialkylamino radicals, alkoxycarbonyl radicals, aryloxycarbonyl radicals, carbomoyl radicals, alkyl- and dialkyl-carbamoyl radicals, acyloxy radicals, acylamino radicals, arylamino radicals, and combinations thereof.

As used herein, structural formulas are employed as is commonly understood in the chemical arts; lines ("—") used to represent associations between a metal atom ("M", Group 3 to Group 15 atoms) and a ligand or ligand atom (e.g. cyclopentadienyl, nitrogen, oxygen, halogen ions, alkyl, etc.), as well as the phrases "associated with", "bonded to" and "bonding", are not limited to representing a certain type of chemical bond, as these lines and phrases are meant to represent a "chemical bond"; a "chemical bond" defined as an attractive force between atoms that is strong enough to permit the combined aggregate to function as a unit, or "compound".

Unless stated otherwise, no embodiment of the present disclosure is herein limited to the oxidation state of the metal atom "M" as defined below in the individual descriptions and examples that follow. The ligation of the metal atom "M" is such that the compounds described herein are neutral, unless otherwise indicated.

As used herein "virgin polymer" or "virgin polyethylene" or "vPE" refers to polymers or polyethylenes made and used directly from a traditional lab scale, pilot scale, demonstration scales or commercial scale apparatus.

As used herein "recycled polymer" or "recycled polymeric material" refers to plastic materials that have been recovered or otherwise diverted from the solid waste stream. Recycled polymers diverted either during the manufacturing process or after the manufacturing process but before consumer use is sometimes referred to as post-industrial resin, post-industrial recycle, or PIR. Recycled materials recovered after consumer use is sometimes referred to as post-consumer recycled resins, or PCR. The term "recycled" refers to both PIR and PCR. Either material, or blends of both, are suitable for use as disclosed herein. Both PCR and PIR materials can be purchased commercially. In one embodiment ECOPRIME™ resin from Envision Plastics, 3101 Towercreek Parkway, Suite 300, Atlanta, Georgia 30339 can be used. Another example of commercially available recycled materials come from KW Plastics recycling division, for example their product grade KWR105BLK.

Commercially available PIR and PCR can vary in composition, as they are often a mixture of polar and/or non-polar materials like: polyethylene (PE), polypropylene homopolymer, polypropylene impact copolymers, polypropylene random copolymer, polyethylene terephthalate, ethylene vinyl alcohol, polyamide, grafted polyolefins, just to name a few. In some embodiments, the recycled polymeric material is derived from polyethylene products so that the PCR is primarily (>85%, >90%, or great than 95%) polyethylene with known contaminants such as inks, antioxidants, metals, or other additives found in consumer plastic goods. In other embodiments, the recycled polymeric material is primarily a mixture of polyolefins (>85%, >90%, or great than 95% of the polyolefin) with known contaminants such as inks, antioxidants, metals, or other additives found in consumer plastic goods. In other embodiments, the recycled polymeric material is a mixture of polyolefins with polymers containing polar groups. In instances of traditional melt blending of materials, incompatibility between the varying kinds of polymeric materials in PCR and the virgin polymers with which they may be blended or compounded, may result in a final product with poor mechanical and optical properties.

As used herein "Non-Polar PCR" or "recycled non-polar polymer" refers to recycled polymeric materials of any source where the mixture includes two or more non-polar polymers, for example combinations of polyolefins, or for example, a combination of polyethylene and polypropylene. The materials may contain impurities such as inks, antioxidants, metals, or other additives found in consumer plastic goods.

As used herein "recycled polyethylene" or "rPE" refers to polyethylene that has been recovered or otherwise diverted from the solid waste stream. In some embodiments rPE can be simulated by exposing virgin polyethylene exposed to at least one, and, in some embodiments several, heat histories. It will be appreciated by those skilled in the art that polyethylene is typically converted into finished goods in processes that involve melting the polyethylene and then forming it into the finished good. The melting process is referred to as a "heat history".

As used herein "model non-polar PCR" refers to mixtures of polyolefins prepared using virgin polyolefins that are blended or mixed together in order to simulate the material composition and material properties of recycled polymeric materials. Some model non-polar PCR resins were prepared from mixtures of polyethylene and polypropylene. Model PCRs can be designed to reflect the compositions and proportions of various polymers in the actual recycled polymeric materials, while not including impurities or contaminants that may be present in those actual recycled materials. Model PCRs can be prepared by melt blending or by solution blending, or by any method used to blend polymers. Model PCRs may be exposed to heat histories.

As used herein "slurry" refers to a mixture including polymer particles and a solvent. The slurry may contain additional components. The particle may vary in average size, size distribution and concentration in the slurry. Solvents useful for creating the slurry include C5-12 hydrocarbon, which may be unsubstituted or substituted by a C1-4 alkyl group, such as pentane, methyl pentane, hexane, heptane, octane, cyclopentane, cyclohexane, methylcyclohexane and hydrogenated naphtha. An example of a suitable solvent which is commercially available is "Isopar E" (C8-12 aliphatic solvent, Exxon Chemical Co.). In some embodiments, the solvent used for the slurry may also be the monomer or comonomer of the primary polymerization reaction.

Recycled polymeric material can be introduced in a polymerization process several ways. For example, the recycled material can be fed into a solution polymerization process using an extruder, which is used to melt and pressurize the polymer into a solution process either directly or by first mixing with solvent. The recycled material can be introduced as a masterbatch. Extruders are capital and energy intensive. Another approach would be to dissolve the recycled polymer in a stirred tank and pump the resulting polymer solution in the continuous polymerization process. This option is also capital intensive and complex as it requires additional heat exchangers, stirred tank and pump to heat and mix the polymer solution.

Another approach is to introduce the recycled polymeric material as a slurry in the polymerization process. The benefit of this method is that the recycled polymeric material slurry can be prepared in a low pressure and temperature environment and then pumped to the polymerization process. High pressure pumps for solid laden solvents offer more flexibility and lower cost vs. extruders or polymer melt pumps. There are multiple location choices to introduce the recycled polymeric slurry in the process: it can be introduced in the reactor feed, or in between reactors (for multiple reactor scenarios) or after the reactors to be purely blended into the virgin polymer solution.

In other embodiments the recycled polymer slurry can be introduced at one or more points during the continuous polymerization process, for example, into the first reactor and into the second reactor, or for example into the feed lines between the first two reactors and at the exit of the third reactor. These additions can occur at the same time or at different times. In these embodiments, additional recycled polymeric material can also be introduced as a masterbatch in the extruder, thereby allowing for final product blends that contain higher percentages of recycled polymeric material.

Feeding the recycled polymer slurry into the polymerization reactor has multiple advantages. In embodiments using a continuous solution polymerization, introducing recycled polymeric material within the solution process has the additional advantage of using the upstream process to melt the material prior to entering the extruder. In pure compounding, a considerable amount of power is consumed by the extruder to melt the recycled polymeric material. Energy is still consumed in the upstream process to melt the recycled polymeric material, but this may be simpler to do, because heat exchangers are already available, or may have advantages. For example, if the recycled polymeric material is introduced within the reactors, it could increase the polymer production for a fixed reactor outlet temperature. In an existing plant, there may be no available power on the extruder to melt recycled polymeric material without reducing compounding rate; it may be less expensive to use a recycled polymer slurry to introduce the recycled polymeric material to the process and melt it there (upstream). Finally, melting the recycled polymeric material in this location will also ensure intimate mixing with the newly forming polymer. In conclusion, a recycled polymer slurry introduced far upstream of the extruder does not necessarily use less power but may be advantageous because modifying extruders is expensive. It should also aid the extruder in the compounding process.

To prepare a polymer slurry the polymer must be presented in an appropriate size to create the slurry for the desired reactor environment. In some embodiments, the average particle sizes of recycled polymer slurry can vary from 0.1 µm to 500 µm, or for example from 1 µm to 200 µm, or from 100 µm to 300 µm. Particle size distribution likewise can vary in any given sample. In some embodiments the average particle sizes of the recycled polymer slurry can vary from 1 mm to 7 mm or from 2 mm to 5 mm. In some embodiments the recycled polymer slurry particle is similar in size to commercially available pellets of virgin polymers, such as polyethylene. The size of the particle chosen will depend on the size of the reactor being used and the size of the feedline into the reactor.

Larger recycled polymer particles can be ground to smaller sizes using any known technique. In addition, companies such as Allgrind Plastics, 6 Vliet Farm Rd, Asbury, NJ 08802, United States, can provide materials ground to desired sizes regimes.

Particle size and distribution can be calculated using laser diffraction PSA. Laser diffraction PSA is conducted with Malvern Instruments MS3000, using what is known as "dry dispersion" or air.

In some embodiments, provided herein are continuous polymerization processes for the preparation of a polyethylene polymer blend product, where the polyethylene polymer blend product includes a blend of a virgin polyethylene and a recycled polymeric material. The polymerization process can take place in at least one polymerization reactor. The polymerization process can take place in at least two polymerization reactors. The polymerization process can take place in at least three polymerization reactors.

Examples of reactors useful for the continuous polymerization processes disclosed herein are continuous stirred tank reactor, tubular reactors, loop flow, cooled loop reactors, and fluidized bed reactors. In one embodiment the continuous polymerization processes includes one CSTR, or two CSTRs or one CSTR and a tubular reactor, or two CSTRs and a tubular reactor. In one embodiment where at least two reactors are used, the reactors are connected in series. In one embodiment where at least two reactors are used, the reactors set up in parallel.

In some embodiments, the recycled polymer slurry can be introduced into the polymerization process at any point. For example, it can be introduced directly into any of the polymerization reactors. In some embodiments, the recycled polymer slurry can be introduced or injected to a reactor with the other reactant feeds, such as the monomer feed, or the ethylene feed, or solvent feed, or catalyst feed. In some embodiments, the recycled polymer slurry can be added between the first and second reactor in the piping connecting the two reactors. In some embodiments, the recycled polymer slurry can be added between the second and third reactor in the piping connecting the two reactors. In some embodiments, the recycled polymer slurry can be added at any point at the end of the polymerization process at the exit of the last reactor up to the solution heater. For example, when there is a tubular reactor, introducing the slurry at its exit. In some embodiments, the recycled polymer slurry can be introduced before or after introduction of the catalyst deactivator.

In some embodiments, when initiating or starting up the reaction, the recycled polymer slurry is introduced into the process before the solution polymerization reaction has started. In some embodiments, when initiating or starting up the reaction, recycled polymer slurry is introduced into the process after the solution polymerization reaction has started. In some embodiments, the recycled polymer slurry is introduced at the end of the production process after the reaction has been terminated using catalyst deactivator.

The recycled polymer slurry or recycled polymer solution can be pre-heated in a suitable heat exchanger to bring the temperature closer to or above the recycled polymer's dissolving temperature before introduction to the process. The recycled polymer slurry or recycled polymer solution can be pre-chilled in a suitable heat exchanger to lower the slurry temperature and enhance the cooling provided by this flow in the reactor (thus increasing production rate).

Also contemplated by this disclosure are embodiments where the recycled polymeric material is prepared as a solution instead of a slurry, by dissolving the recycled material in a solvent. This dissolution may happen chemically before introduction into the reaction stream. Or the particles may dissolve once in the reactor as a result of the heat of the reaction raising the temperature of the solvent sufficiently to cause the polymer to dissolve in the solvent. Or they may dissolve in the piping between CSTRs or in the tubular reactor due to the polymer solution being hot enough to do so. Any embodiment disclosed for a recycled polymer slurry is expected to work just as effectively with a recycled polymer solution.

Solution processes for the copolymerization of ethylene and an alpha olefin having from 3 to 12 carbon atoms are well known in the art. These processes are conducted in the presence of an inert hydrocarbon solvent typically a C5-12 hydrocarbon which may be unsubstituted or substituted by a C1-4 alkyl group, such as pentane, methyl pentane, hexane, heptane, octane, cyclopentane, cyclohexane, methylcyclohexane and hydrogenated naphtha. An example of a suitable solvent which is commercially available is "Isopar E" (C8-12 aliphatic solvent, Exxon Chemical Co.).

In general, a continuous polymerization process may use one or more polymerization reactors. Any type of continuous polymerization reactor is contemplated alone or in combination with other continuous polymerization reactors. In some embodiments herein, the continuous polymerization process is a solution process that includes one CSTR. In some embodiments, the continuous polymerization process is a solution process that includes one continuously stirred tank reactor (CSTR) in combination with an additional CSTR. In some embodiments, the continuous polymerization process is a solution process that includes one CSTR in combination with tubular reactor. In some embodiments, the continuous polymerization process is a solution process that includes one CSTR in combination with an additional CSTR and a tubular reactor.

In other embodiments, the continuous polymerization process is a typical gas phase polymerization of olefins, run for example at 80 to 100° C. and 30-35 bar reactor pressure. The density of the products produced in this method may vary and may be, for example, between 0.91 and 0.97 g/cm3. Typical catalysts employed for ethylene polymerization are Ziegler-Natta, metallocene coordination, and transition metal catalysts. A variety of solvents can be used for the recycled polymer slurry in gas phase reactors, including hexane, iso-pentane, and solvents that are also a comonomer of the polymerization reaction, such as olefins like butene, 1-hexene, and the like.

The polymerization temperature in at least one CSTR is from about 80° C. to about 280° C. (for example from about 120° C. to 220° C.) and the tubular reactor is operated at a slightly higher temperature. Cold feed (i.e. chilled solvent and/or monomer) may be added to the CSTR(s). The polymerization enthalpy heats the reactor. The polymerization solution which exits the reactor may be more than 100° C. hotter than the reactor feed temperature. Agitation efficiency in the CSTR may be determined by measuring the reactor temperature at several different points. The largest temperature difference (i.e. between the hottest and coldest temperature measurements) is described as the internal temperature gradient for the polymerization reactor. A very well mixed CSTR has a maximum internal temperature gradient of less than 10° C. Pressures are from about 500 psi to 8,000 psi. In some embodiments the reaction process is a "medium pressure process", which means that the pressure in each reactor is less than about 6,000 psi (about 41,000 kilopascals or kPa), or for example from 1,500 psi to 3,000 psi (about 10,000-21,000 kPa). Pressures can range from about 10,000 to about 40,000 kPa, or from about 2,000 to about 3,000 psi (about 14,000-about 22,000 kPa), or from 725 to about 3,000 psi (about 5,000-about 22,000 kPa).

If more than one CSTR is employed, catalyst is added to each of the CSTRs. The catalyst used in each CSTR may be the same or different.

In some embodiments a tubular reactor is connected to the discharge of a CSTR. (For clarity, if two CSTR's are used in series, then the tubular reactor receives the discharge from the second CSTR).

The term "tubular reactor" is meant to convey its conventional meaning—namely a simple tube. A tubular reactor may have a length/diameter (L/D) ratio of at least 10/1. In some embodiments, the tubular reactor is operated adiabatically. Thus, as polymerization progresses, the remaining comonomer is increasingly consumed and the temperature of the solution increases (both of which improve the efficiency of separating the remaining comonomer from the polymer solution). In some embodiments, the temperature increase along the length of the tubular reactor is greater than 3° C. (i.e. that the discharge temperature from the tubular reactor is at least 3° C. greater than the discharge temperature from the CSTR that feeds the tubular reactor).

The tubular reactor used in this disclosure has a feed port for additional ethylene and solvent. The feed is "tempered"—i.e. the temperature of the additional ethylene and/or solvent is heated to above ambient (for example to about 100° C.) but the temperature is below the discharge temperature of the tubular reactor. In one embodiment, the ethylene is tempered to between 100 and 200° C. In some embodiments the ethylene is added with solvent. The amount of solvent (expressed as a weight ratio, based on ethylene) may be from 20/1 to 0.1/1, or from 10/1 to 1/1.

Optionally, the tubular reactor may also have feed ports for additional catalyst, cocatalyst, comonomer and/or telomerization agent (such as hydrogen).

The total volume of the tubular reactor may be at least 10 volume % of the volume of one CSTR, for example from 30% to 200%. The total amount of ethylene added to the tubular reactor is for example from 1 to 50 weight % of the total ethylene added to the CSTR(s). For example, if one CSTR is being operated with an ethylene flow rate of 1000 kg/hr, then the ethylene flow to the tubular reactor would be from 10 to 500 kg/hr. Similarly, if two CSTR(s) were being operated with an ethylene flow of 1000 kg/hr to the first and 500 kg/hr to the second, then the flow of ethylene to the tubular reactor would be from 15 to 750 kg/hr.

Suitable monomers for copolymerization with ethylene include C3-20 mono- and diolefins. Example comonomers include C3-12 alpha olefins which are unsubstituted or substituted by up to two C1-6 alkyl radicals, C8-12 vinyl aromatic monomers which are unsubstituted or substituted by up to two substituents selected from C1-4 alkyl radicals, C4-12 straight chained or cyclic diolefins which are unsubstituted or substituted by a C1-4 alkyl radical. Illustrative non-limiting examples of such alpha-olefins are one or more of propylene, 1-butene, 1-pentene, 1-hexene, 1-octene and 1-decene, styrene, alpha methyl styrene, and the constrained-ring cyclic olefins such as cyclobutene, cyclopentene, dicyclopentadiene norbornene, alkyl-substituted norbornes, alkenyl-substituted norbornes and the like (e.g. 5-methylene-2-norbornene and 5-ethylidene-2-norbornene, bicyclo-(2,2,1)-hepta-2,5-diene).

Co- and ter-polymers of ethylene, and one or more co-polymerizable monomers can also be prepared using the methods described herein. In one embodiment such polymers will contain about 50 to about 75 weight % ethylene, or about 50 to 60 weight % ethylene and correspondingly from 50 to 40 weight % of propylene. A portion of the monomers, typically the propylene monomer, may be replaced by a conjugated diolefin. The diolefin may be present in amounts up to 10 weight % of the polymer although typically is present in amounts from about 3 to 5 weight %. The resulting polymer may have a composition including from 40 to 75 weight % of ethylene, from 50 to 15 weight % of propylene and up to 10 weight % of a diene monomer to provide 100 weight % of the polymer. Non limiting examples of the dienes are dicyclopentadiene, 1,4-hexadiene, 5-methylene-2-norbornene, 5-ethylidene-2-norbornene and 5-vinyl-2-norbornene. In some embodiments the diene is chosen from 5-ethylidene-2-norbornene 1,4-hexadiene, and 1,5-hexadiene.

In another embodiment the resulting polymer may include not less than about 80, or not less than about 90 weight % of ethylene and up to about 20, or less than 10 weight % of one or more co-polymerizable monomers. In some embodiments the comonomers are C3-8 alpha olefins such as 1-butene, 1-hexene and 1-octene.

The monomers are dissolved/dispersed in the inert hydrocarbon solvent prior to being fed to the first CSTR (or for gaseous monomers the monomer may be fed to the reactor so that it will dissolve in the reaction mixture). Prior to mixing, the solvent and monomers are generally purified to remove potential catalyst poisons such as water, oxygen or other polar impurities. The feedstock purification follows standard practices in the art, e.g. molecular sieves, alumina beds and oxygen removal catalysts are used for the purification of monomers.

Generally, the catalyst components may be premixed in the solvent for the reaction or fed as separate streams to each reactor. In some instances, premixing may be desirable to provide a reaction time for the catalyst components prior to entering the first CSTR. Such an "in line mixing" technique is known in the art.

The residence time in each reactor will depend on the design and the capacity of the reactor. Generally, the reactors should be operated under conditions to achieve a thorough mixing of the reactants.

Any catalyst system that is capable of providing ethylene polymers under solution conditions may be employed.

"Ziegler Natta" polymerization catalysts may also be employed. These catalysts typically include a group 4 or group 5 metal—for example titanium or vanadium—in combination with hydrocarbyl aluminum activator of the general formula:

$$Al(Ra1)_a(ORb1)_b(X)_c$$

where Ra1 is a hydrocarbyl group having from 1 to 10 carbon atoms; ORb1 is an alkoxy or aryloxy group where ORb1 is a hydrocarbyl fragment having from 1 to 10 carbon atoms and being bonded to oxygen; X is chloride or bromide and a+b+c=3, with the proviso that a is greater than 0. Examples of the hydrocarbyl aluminum activator in widespread use include trimethyl aluminum, trimethyl aluminum and tributyl aluminum.

Exemplary Ziegler Natta catalysts contain at least one of titanium or vanadium. Exemplary titanium compounds include titanium halides (for example titanium chlorides, of which TiCl4 is a specific example); titanium alkyls; titanium alkoxides (which may be prepared by reacting a titanium alkyl with an alcohol) and "mixed ligand" compounds (i.e. compounds which contain more than one of the above described halide, alkyl and alkoxide ligands). Exemplary vanadium compounds may also contain halide, alkyl or alkoxide ligands. In addition vanadium oxy trichloride ("VOCl3") is known as a Ziegler Natta catalyst component and is suitable for use in the present disclosure.

As will be appreciated by those skilled in the art of ethylene polymerization, conventional Ziegler Natta catalysts may also incorporate additional components such as an electron donor (for example an amine or an ether) and/or a magnesium compound (for example a magnesium chloride and/or magnesium alkyl such as a butyl ethyl magnesium). A halide source (which is typically a chloride such as tertiary butyl chloride) is typically used when a magnesium alkyl compound is employed.

Such components, if employed, may be added to the other catalyst components prior to introduction to the reactor or may be directly added to the reactor.

In some embodiments the Ziegler Natta catalyst contains a titanium compound, a magnesium alkyl compound and a chloride compound and that an aluminum alkoxide is used as the cocatalyst.

The polymerization processes may also use an aluminum alkyl activator, for example trialkyl aluminum compounds or MAO.

In some embodiments, a well characterized organometallic compound is used as the catalyst compound in the process of this disclosure instead of, or in addition to, the Ziegler Natta catalyst. These catalyst compounds typically include a metal atom, at least one "functional" ligand and at least one leaving group.

Single site catalysts are also suitable catalysts for use herein. The term "single site catalyst" refers to a catalyst system that produces homogeneous ethylene polymers, which may or may not contain long chain branching. A non-limiting example includes the bulky ligand single site catalyst of the formula:

$$(L)_n-M-(Y)_p$$

wherein M is chosen from Ti, Zr, and Hf; L is a monoanionic ligand independently chosen from cyclopentadienyl-type ligands, and a bulky heteroatom ligand containing not less than five atoms in total (typically of which at least 20%, or at least 25% numerically are carbon atoms) and further containing at least one heteroatom chosen from boron, nitrogen, oxygen, phosphorus, sulfur and silicon, said bulky heteroatom ligand being sigma or pi-bonded to M; Y is independently chosen from activatable ligands; n may be from 1 to 3; and p may be from 1 to 3, provided that the sum of n+p equals the valence state of M, and further provided that two L ligands may be bridged.

Non-limiting examples of bridging groups include bridging groups containing at least one Group 13 to 16 atom, often referred to as a divalent moiety such as, but not limited to, at least one of a carbon, oxygen, nitrogen, silicon, boron, germanium and tin atom or a combination thereof. In some embodiments the bridging group contains a carbon, silicon or germanium atom, or for example, at least one silicon atom or at least one carbon atom. The bridging group may also contain substituent radicals, including halogens.

Some bridging groups include but are not limited to a di C1-6 alkyl radical (e.g. alkylene radical for example an ethylene bridge), di C6-10 aryl radical (e.g. a benzyl radical having two bonding positions available), silicon or germanium radicals substituted by one or more radicals chosen from C1-6 alkyl, C6-10 aryl, phosphine or amine radical which are unsubstituted or up to fully substituted by one or more C1-6 alkyl or C6-10 aryl radicals, or a hydrocarbyl radical such as a C1-6 alkyl radical or a C6-10 arylene (e.g. divalent aryl radicals); divalent C1-6 alkoxide radicals (e.g. —CH2CHOHCH2-) and the like.

Exemplary of the silyl species of bridging groups are dimethylsilyl, methylphenylsilyl, diethylsilyl, ethylphenylsilyl or diphenylsilyl compounds.

Exemplary hydrocarbyl radicals for bridging groups include methylene, ethylene, propylene, butylene, phenylene and the like.

Exemplary bridging amides include dimethylamide, diethylamide, methylethylamide, di-t-butylamide, diisoproylamide and the like.

The term "cyclopentadienyl", frequently abbreviated as "Cp", refers to a 5-member carbon ring having delocalized bonding within the ring and typically being bound to the active catalyst site, generally a group 4 metal (M) through η5-bonds. The cyclopentadienyl ligand may be unsubstituted or up to fully substituted with one or more substituents chosen from C1-10 hydrocarbyl radicals in which hydrocarbyl substituents are unsubstituted or further substituted by one or more substituents chosen from a halogen atom and a C1-4 alkyl radical; a halogen atom; a $C_{1-8}$ alkoxy radical; a C6-10 aryl or aryloxy radical; an amido radical which is unsubstituted or substituted by up to two $C_{1-8}$ alkyl radicals; a phosphido radical which is unsubstituted or substituted by up to two $C_{1-8}$ alkyl radicals; silyl radicals of the formula —Si—(R)3 wherein each R is independently chosen from hydrogen, a $C_{1-8}$ alkyl or alkoxy radical, and C6-10 aryl or aryloxy radicals; and germanyl radicals of the formula —Ge—(R)3 wherein R is as defined above.

In some embodiments, the cyclopentadienyl-type ligand is chosen from a cyclopentadienyl radical, an indenyl radical and a fluorenyl radical where the radicals are unsubstituted or up to fully substituted by one or more substituents chosen from a fluorine atom, a chlorine atom; C1-4 alkyl radicals; and a phenyl or benzyl radical which is unsubstituted or substituted by one or more fluorine atoms.

If none of the L ligands is bulky heteroatom ligand then the catalyst could be a bis-Cp catalyst (a traditional metallocene) or a bridged constrained geometry type catalyst or tris-Cp catalyst.

If the catalyst contains one or more bulky heteroatom ligands the catalyst would have the formula:

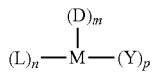

wherein M is a transition metal chosen from Ti, Hf and Zr; D is independently a bulky heteroatom ligand (as described below); L is a monoanionic ligand chosen from cyclopentadienyl-type ligands; Y is independently chosen from activatable ligands; m is 1 or 2; n is 0, 1 or 2; p is an integer; and the sum of m+n+p equals the valence state of M, provided that when m is 2, D may be the same or different bulky heteroatom ligands.

For example, the catalyst may be a bis(phosphinimine), or a mixed phosphinimine ketimide dichloride complex of titanium, zirconium or hafnium. Alternately, the catalyst could contain one phosphinimine ligand or one ketimide ligand, one "L" ligand (which is in some embodiments a cyclopentadienyl-type ligand) and two "Y" ligands (which are in some examples both chloride).

Exemplary metals (M) are from Group 4, for example titanium, hafnium or zirconium, or for example titanium. In one embodiment the catalysts are group 4 metal complexes in the highest oxidation state.

Bulky heteroatom ligands (D) include but are not limited to phosphinimine ligands (PI) and ketimide (ketimine) ligands.

The phosphinimine ligand (PI) is defined by the formula:

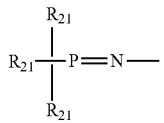

wherein each $R_{21}$ is independently chosen from a hydrogen atom; a halogen atom; $C_{1-20}$, for example $C_{1-10}$ hydrocarbyl radicals which are unsubstituted by or further substituted by a halogen atom; a $C_{1-8}$ alkoxy radical; a $C_{6-10}$ aryl or aryloxy radical; an amido radical; a silyl radical of the formula: —Si—$(R_{22})_3$, wherein each $R_{22}$ is independently chosen from hydrogen, a $C_{1-8}$ alkyl or alkoxy radical, and $C_{6-10}$ aryl or aryloxy radicals; and a germanyl radical of the formula: —Ge—$(R_{22})_3$, wherein $R_{22}$ is as defined above.

In some embodiments, the phosphinimines are those in which each $R_{21}$ is a hydrocarbyl radical, for example a C1-6 hydrocarbyl radical.

Suitable phosphinimine catalysts are Group 4 organometallic complexes which contain one phosphinimine ligand (as described above) and one ligand L which is either a cyclopentadienyl-type ligand or a heteroatom ligand.

As used herein, the term "ketimide ligand" refers to a ligand which:
is bonded to the transition metal via a metal-nitrogen atom bond;
has a single substituent on the nitrogen atom (where this single substituent is a carbon atom which is doubly bonded to the N atom); and
has two substituents Sub1 and Sub2 (described below) which are bonded to the carbon atom.
Conditions a, b and c are illustrated below:

where the substituents Sub1 and Sub2 may be the same or different and may be further bonded together through a bridging group to form a ring. Exemplary substituents include hydrocarbyls having from 1 to 20 carbon atoms, for example from 3 to 6 carbon atoms, silyl groups (as described below), amido groups (as described below) and phosphido groups (as described below). In some embodiments, both of these substituents are hydrocarbyls, for example alkyls or for example tertiary butyl.

Suitable ketimide catalysts are Group 4 organometallic complexes which contain one ketimide ligand (as described above) and one ligand L which is either a cyclopentadienyl-type ligand or a heteroatom ligand.

The term bulky heteroatom ligand (D) is not limited to phosphinimine or ketimide ligands and includes ligands which contain at least one heteroatom chosen from boron, nitrogen, oxygen, phosphorus, sulfur and silicon. The heteroatom ligand may be sigma or pi-bonded to the metal. Exemplary heteroatom ligands include silicon-containing heteroatom ligands, amido ligands, alkoxy ligands, boron heterocyclic ligands and phosphole ligands, as all described below.

Silicon containing heteroatom ligands are defined by the formula:

wherein the —denotes a bond to the transition metal and Y is sulfur or oxygen. The substituents on the Si atom, namely Rx, Ry and Rz, satisfy the bonding orbital of the Si atom. The use of any particular substituent Rx, Ry or Rz is not especially important to success. In some embodiments each of Rx, Ry and Rz is a C1-2 hydrocarbyl group (i.e. methyl or ethyl) simply because such materials are readily synthesized from commercially available materials.

Boron heterocyclic ligands are characterized by the presence of a boron atom in a closed ring ligand. This definition includes heterocyclic ligands which also contain a nitrogen atom in the ring. These ligands are well known to those skilled in the art of olefin polymerization.

The term "phosphole" is also meant to convey its conventional meaning. Phospholes are cyclic dienyl structures having four carbon atoms and one phosphorus atom in the closed ring. The simplest phosphole is C4PH4 (which is analogous to cyclopentadiene with one carbon in the ring being replaced by phosphorus). The phosphole ligands may be substituted with, for example, C1-20 hydrocarbyl radicals (which may, optionally, contain halogen substituents); phosphido radicals; amido radicals; or silyl or alkoxy radicals.

The current disclosure also contemplates the use of chromium catalysts that are also well known in the art. The term "chromium catalysts" describes olefin polymerization catalysts including a chromium species, such as silyl chromate, chromium oxide, or chromocene on a metal oxide support such as silica or alumina. Suitable cocatalysts for chromium catalysts, are well known in the art, non-limiting examples include trialkylaluminum, alkylaluminoxane, dialkoxyalkylaluminum compounds and the like.

Another embodiment of this disclosure provides a polymer or copolymer that is a blend of virgin polyethylene and recycled polymeric material having a density from about 0.880 g/cc to about 0.960 g/cc. Another embodiment of disclosure provides a polymer or copolymer that is a blend of virgin polyethylene and recycled polymeric material with a MWD from about 3 to about 12. Another embodiment provided is a polymer or copolymer that is a blend of virgin polyethylene and recycled polymeric material with melt index from 0.2-150 g/10 min.

loaded into the mixer and allowed to reach a set temperature of 190° C., at which point a 80/20 mixture of HDPE and hPP/ICP was added to the bowl and the motor engaged to rotate the rollers at 60 rpm, followed by lowering of the nitrogen purge lever into place. It is desirable to perform these steps quickly to promote sample homogeneity and prevent oxidation of the sample. Mixing was continued for 10 minutes before disengaging the rollers and the nitrogen purge lever. Moving quickly, the molten polymer was pressed using an MIII Clicker press and the flattened polymer was then quench cooled in liquid nitrogen. Samples of each model non-polar PCR were characterized by SEM, FTIR, TREF-CEF, DSC, GPC. The mechanical properties were evaluated by tensile test and DMA. Table 1 shows the composition and characterization of the model non-polar PCRs (mnPCR's) used for subsequent experiments.

TABLE 1

| Model PCR | HDPE Component | PP Component | Density (g/cm$^3$) | $I_2$ (g/10 min) | $I_{21}$ (g/10 min) | Mw/Mn |
|---|---|---|---|---|---|---|
| mnPCR-2 | 19A | Pro-fax™ 6301 (hPP) | 0.9488 | 1.23 | 122 | 9.65 |
| mnPCR-3 | CCS757-A | Pro-fax™ 6301 (hPP) | 0.9456 | 7.75 | 380 | 5.39 |
| mnPCR-4 | CCS757-A | Formolene™ 6535 (ICP) | 0.9462 | 7.77 | 387 | 5 |

Another embodiment of this disclosure provides a polymer or copolymer that is a blend of virgin polyethylene and recycled polymeric material which could have at least one of polymer additive as antioxidant, antistatic, nucleating or clarifying agents, light stabilizers, heat stabilizers, heat stabilizers, lubricants, processing aids, antilocking, mold release, coupling agents, fillers, flame retardant, antistatic, neutralizers, antimicrobials, compatibilizing agents, chain extenders, crosslinking agents, crosslinked polymeric additive, foaming agent, interfacial agents, impact modifiers. Another embodiment of this disclosure provides a polymer as described herein above for use in fabrication methods selected from extrusion, injection molding, thermoforming, and rotational molding.

Another embodiment of this disclosure provides a polymer as described herein above for use in plastic articles such as films, fibers, molded or thermoformed articles such as drums and agricultural spray tanks, and pipe coatings.

The present invention will further be described by reference to the following examples. The following examples are merely illustrative of the invention and are not intended to be limiting. Unless otherwise indicated, all percentages are by weight.

EXAMPLES

Preparation of Model Non-Polar PCR

Model non-polar PCR samples having 20 wt % polypropylene and 80 wt % polyethylene were prepared by melt blending one of two high-density polyethylenes (HDPEs) with a polypropylene, either polypropylene homopolymer (hPP) or a PP impact copolymer (ICP). The two HDPEs used were CCS757-A and 19A, both commercial products available from NOVA Chemicals, the hPP used was Pro-Fax™6301, available from Lyondellbasell (LBI), and the ICP used was Formolene™6535, available from Formosa Plastics. A Brabender mixer was used for preparation as follows: the appropriate size bowl (20 cc or 200 cc) was All model non-polar PCR samples showed good mixing when visually inspected. The SEM analyses showed a two-phase morphology (polypropylene particles are dispersed randomly in the polyethylene matrix) and poor adhesion between the polyethylene and polypropylene components, as expected, supporting the view that the model non-polar PCR samples possess material properties similar to recycled polymeric materials.

The model non-polar PCR samples were then blended with virgin polyethylene either by including the model non-polar PCR samples in a solution polymerization process (PB), by solution blending with a virgin polyethylene in a solution phase reactor (SB), or by melt blending with virgin polyethylene. Also, a Brabender blend of model mnPCR-4 with virgin polyethylene was created following the same mixing process used to create the model non-polar PCR samples. Samples from each of the blending experiments were compression molded and tested to assess the effect of the presence of model non-polar PCR in virgin PE with respect to tensile properties.

Polymerization Blending

The purpose of these experiments was to demonstrate the polymerization of polyethylene in the presence of a model non-polar PCR while maintaining an active reaction. Samples of 2, 8, or 9 grams of model non-polar PCR, 100% iCP, or 100% hPP, after being held under vacuum for 5-6 hours, were loaded into an empty bench lab scale reactor. The reactor was then purged with C2 (pressurized to 5 bar/vented x3), then pressurized to 3 bar(a) C2, then heated to 140° C. Polymerization was performed by operating the reactor in solution phase in cyclohexane (500 mL) at 140° C., stirred at 1000 rpm, at a pressure of up to 8.6 bar, and in the presence of a cyclopentadienyl tri(tertiary butyl)phosphinimine titanium dichloride (Cp[(t-Bu)3PN]TiCl2) catalyst, triphenylcarbenium salt of tetrakis pentafluorophenyl boron co-catalyst, and a methylaluminoxane scavenger (Al), which were injected simultaneously into the reactor. The ratio of methylaluminoxane scavenger to co-catalyst was 0.3 and 1.3 wt % of ethylene was added to the reactor. Polymerization conditions for each experiment or run, including source and amount added of PCR (either model non-polar PCR, 100% ICP, 100% hPP, or nothing), reaction time, and amounts of catalyst, co-catalyst, and scavenger used are shown in Table 2.

Reactions were quenched after 2 to 12 minutes by treating with 12 bar of $CO_2$ for five minutes. The reactor was then cooled to room temperature and vented. A dried powder was extracted and ground into powder to be used for additional melt blending, or for compression molding to assist in tensile characterization. The polymerization results for each run, including yield of PE (actual and normalized) and wt % of PCR in the final PE product are shown in Table 2 and reveal that the catalyst remained active, for most conditions, in the presence of recycled material. This shows solution phase polymerization in the presence of a model recycled material may be a viable option for blending of virgin PE with post-consumer recycled PE. Polymerization blending refers to the blending of model non-polar PCR with virgin PE produced during polymerization.

Solution Blending

Solution blends (SB) of virgin polyethylene and model non-polar PCR were prepared by using the same process used for polymerization blending, except 4 g of HDPE pellets, prepared previously by using a NOVA Chemicals' proprietary single site catalyst, were added to the reactor in place of the catalyst, co-catalyst, methylaluminoxane scavenger, and ethylene. The purpose of solution blending was to show whether changes, if any, to polymer tensile properties were due to the reactor conditions or to the presence of model non-polar PCR during the polymerization process. The final product was targeted to have 30% by weight of model non-polar PCR Melt Blending Melt blending was performed by dissolving a mixture of model non-polar PCR and virgin PE in cyclohexane and then melting and mixing in a reactor chamber at 140° C. Once melted the chamber was then vented and the mixture allowed to cool and dry. Dried samples were ground into powder which was then compression molded and subjected to film tensile testing. Melt blending was performed both for a dry mixture of non-model PCR and virgin PE (melt blending after solution blending—MB) and for dried polymerization reaction powder (melt blending after polymerization—MP).

TABLE 2

| PCR | Run # | PCR (g) | CAT (mmol/L) | Al (mmol/L) | COCAT (mmol/L) | Time of reaction (min) | wt % PCR (final product) | PE isolated yield (g) | PE normalized yield (g PE/hr) |
|---|---|---|---|---|---|---|---|---|---|
| 100% ICP | 265 | 9 | 0.01 | 1.5 | 12 | 7 | 83 | 10.86 | 93 |
| 100% ICP | 268 | 2 | 0.02 | 1.5 | 24 | 7 | 7.6 | 26.38 | 226 |
| 100% ICP | 273 | 8 | 0.02 | 1.5 | 24 | 12 | 76 | 10.47 | 52 |
| 100% hPP | 266 | 9 | 0.01 | 1.5 | 12 | 7 | 28 | 32.26 | 277 |
| 100% hPP | 269 | 2 | 0.02 | 1.5 | 24 | 7 | 5.5 | 36.29 | 311 |
| mnPCR-2 | 233 | 2 | 0.01 | 1 | 12 | 2 | 13 | 15.44 | 463 |
| mnPCR-2 | 237 | 2 | 0.01 | 1 | 12 | 2 | 14.4 | 13.95 | 419 |
| mnPCR-2 | 257 | 2 | 0.001 | 1 | 1.2 | 3 | 19.9 | 10.05 | 201 |
| mnPCR-2 | 260 | 2 | 0.001 | 1 | 1.2 | 3 | 22.99 | 8.70 | 174 |
| mnPCR-2 | 267 | 9 | 0.01 | 1.5 | 12 | 7 | 26 | 34.69 | 297 |
| mnPCR-3 | 232 | 2 | 0.01 | 1 | 12 | 2 | 8.68 | 18.11 | 543 |
| mnPCR-3 | 235 | 2 | 0.01 | 1 | 12 | 2 | 7.19 | 11.27 | 338 |
| mnPCR-3 | 262 | 9 | 0.01 | 1.5 | 12 | 5 | 27 | 33.19 | 398 |
| mnPCR-4 | 234 | 2 | 0.01 | 1 | 12 | 2 | 12.2 | 16.35 | 491 |
| mnPCR-4 | 236 | 2 | 0.01 | 1 | 12 | 2 | 14.3 | 14.00 | 420 |
| mnPCR-4 | 258 | 2 | 0.001 | 1 | 1.2 | 3 | 22.65 | 8.83 | 177 |
| mnPCR-4 | 261 | 2 | 0.001 | 1 | 1.2 | 3 | 20.28 | 9.86 | 197 |
| mnPCR-4 | 264 | 9 | 0.01 | 1.5 | 12 | 5 | 64 | 14.03 | 168 |
| mnPCR-4 | 272 | 8 | 0.02 | 1.5 | 24 | 12 | 28 | 28.43 | 142 |
| Blank | 270 | 0 | 0.02 | 1.5 | 24 | 7 | — | 16.88 | 145 |

SEM Microscopy

The HITACHI S3400N Type II Scanning Electron Microscope (SEM) permits the surface observation and characterization of heterogeneous organic and inorganic materials on a micrometer scale. The examined area is irradiated with a finely focused electron beam. When the electron beam impinges on a specimen surface it produces secondary electron and back-scattered electron signals. The signals are obtained from specific emission volumes within the sample and can be used to examine many characteristics such as composition, surface topography, and crystallography. Images at high resolution, great depth of field and three-dimensional appearances were obtained of model non-polar PCR samples 2 through 4.

Film Tensile

Film tensile properties were determined of various runs and samples using ASTM D882-18: tensile break strength (MPa), elongation at break (%), tensile yield strength (MPa), tensile elongation at yield (%) and film toughness or total energy to break (ft·lb/in). Tensile properties were measured of the compression molded films.

Results, summarized in Table 3, of film tensile testing of compression molded films of blended products show no major differences in the stress at the yield and break point for blends made by polymerization (PB), solution blending (SB), melt blending after polymerization (MP), melt blending after solution blending (MB), and Brabender blending (BB). The polymer blend created by polymerization of ethylene in the presence of a model PCR displayed similar mechanical properties of polyethylene formed in the absence of the model PCR (neat PE—base line).

TABLE 3

| Sample | Stress - Yield (MPa) | | | | | Stress - Break (MPa) | | | | | Elongation - Yield (%) | | | | |
|---|---|---|---|---|---|---|---|---|---|---|---|---|---|---|---|
| | PB | SB | MB | MP | BB | PB | SB | MB | MP | BB | PB | SB | MB | MP | BB |
| Base line | 21.0 | | | 30.2 | | 21.0 | | | 21.5 | | 3.0 | | | 8.0 | |
| mnPCR2 + PE | 25.8 | 12.9 | 28.5 | 28.3 | | 20.8 | 12.9 | 22.6 | 23.2 | | 8.0 | 6.6 | 9.0 | 9.0 | |
| mnPCR3 + PE | 26.1 | 13.4 | 27.4 | 27.2 | | 20.7 | 13.4 | 22.7 | 27.2 | | 8.0 | 7.0 | 7.0 | 5.0 | |
| mnPCR4 + PE | 24.6 | 12.6 | 27.0 | 28.1 | | 24.6 | 12.6 | 20.2 | 24.1 | | 7.0 | 7.0 | 7.0 | 8.0 | |
| mnPCR4 + PE | | | | | 27.1 | | | | | 20.6 | | | | | 10.0 |

INDUSTRIAL APPLICABILITY

The process is associated with post-consumer recyclable (PCR) material. The process is applicable to blending non-polar PCR with virgin polyethylene.

The invention claimed is:

1. A continuous polymerization process for the preparation of a polyethylene polymer blend product, the polyethylene polymer blend product comprising a blend of a virgin polyethylene and a recycled non-polar polymer, in at least one polymerization reactor, wherein the continuous polymerization process comprises:
    preparing a slurry of recycled non-polar polymer in a solvent;
    providing the slurry of recycled non-polar polymer to a first continuous polymerization reactor;
    providing ethylene and, optionally, at least one $C_4$ to $C_{10}$ alpha-olefin comonomer, to the first continuous polymerization reactor in the presence of a first catalyst system;
    operating the first continuous polymerization reactor under solution polymerization conditions thereby producing a first polyethylene polymer blend product comprising polyethylene and the recycled non-polar polymer; and
    discharging the first polyethylene polymer blend product from the first continuous polymerization reactor.

2. The process of claim 1, wherein the first polyethylene polymer blend product is discharged from the first continuous polymerization reactor into a tubular reactor and further comprising the steps of
    optionally directing additional ethylene to the tubular reactor under polymerization conditions whereby additional polymerization occurs in the presence of the first polyethylene polymer blend product; and
    discharging from the tubular reactor a final polyethylene polymer blend product.

3. The process of claim 1, wherein the first polyethylene polymer blend product is discharged from the first continuous polymerization reactor into a second continuous polymerization reactor in the presence of a second catalyst system and further comprising the steps of
    operating the second continuous polymerization reactor under solution polymerization conditions; and
    discharging from the second continuous polymerization reactor a second polymer blend product.

4. The process of claim 3, wherein the second polyethylene polymer blend product is discharged from the second continuous polymerization reactor into a tubular reactor and further comprising the steps of:
    optionally directing additional ethylene to the tubular reactor under polymerization conditions whereby additional polymerization occurs in the presence of the second polyethylene polymer blend product; and
    discharging from the tubular reactor a final polyethylene polymer blend product.

5. The process of claim 1, wherein the first catalyst system is a Ziegler Natta catalyst system.

6. The process of claim 1, wherein the first catalyst system is a single site catalyst system.

7. The process of claim 3, wherein the second catalyst system is a Ziegler Natta catalyst system.

8. The process of claim 3, wherein the second catalyst system is a single site catalyst system.

9. The process of claim 1, wherein the first continuous polymerization reactor is operated at a temperature of 100° C. to 200° C.

10. The process of claim 1, wherein the first continuous polymerization reactor is operated at a temperature of 100° C. to 140° C.

11. The process of claim 3, wherein the second continuous polymerization reactor is operated at a temperature of between 20° C. and 40° C. greater than the operating temperature of the first continuous polymerization reactor.

12. The process of claim 1, wherein the solvent used to make the slurry is selected from the group consisting of $C_{5-12}$ hydrocarbons and $C_{5-12}$ hydrocarbons substituted by a $C_{1-4}$ alkyl groups.

13. The process of claim 1, wherein the solvent used to make the slurry is selected from the group consisting of pentane, methyl pentane, hexane, heptane, octane, cyclohexane, cyclopentane, methylcyclohexane, and hydrogenated naphtha.

14. The process of claim 1, wherein the first continuous polymerization reactor is operated at a pressure of between 1,500 psi to 3,000 psi.

15. The process of claim 1, wherein hydrogen is added to the first continuous polymerization reactor.

16. The process of claim 1, wherein the first polyethylene blend product is comprised of from 1% to 50% of the recycled non-polar polymer.

17. The process of claim 1, wherein the first blend product is comprised of from 10% to 20% of the recycled non-polar polymer.

18. A continuous polymerization process for the preparation of a polyethylene polymer blend product, the polyethylene polymer blend product comprising a blend of a virgin polyethylene and a recycled polyethylene, in at least one polymerization reactor, wherein the continuous polymerization process comprises:
    preparing a slurry of recycled non-polar polymer in a solvent;
    providing ethylene and, optionally, at least one $C_4$ to $C_{10}$ alpha-olefin comonomer, to a first continuous polymerization reactor in the presence of a first catalyst system;
    operating the first continuous polymerization reactor under solution polymerization conditions;
    thereby producing a first polyethylene product;
    discharging the first polyethylene product from the first continuous polymerization reactor into a second continuous polymerization reactor;
    providing ethylene and, optionally, at least one $C_4$ to $C_{10}$ alpha-olefin comonomer, to the second continuous polymerization reactor in the presence of a second catalyst system;
    providing the slurry of recycled non-polar polymer to the second continuous polymerization reactor;
    operating the second continuous polymerization reactor under solution polymerization conditions;
    thereby producing a first polyethylene polymer blend product comprising the first polyethylene product and the recycled non-polar polymer;
    discharging the first polyethylene polymer blend product from the second continuous polymerization reactor.

19. The process of claim 18, wherein the first polyethylene polymer blend product is discharged from the second continuous polymerization reactor into a tubular reactor and further comprising the steps of:
    optionally directing additional ethylene or add to the tubular reactor under polymerization conditions whereby additional polyethylene polymerization occurs in the presence of the polymer blend product; and
    discharging from the tubular reactor a final polyethylene polymer blend product.

20. A continuous polymerization process for the preparation of a polyethylene polymer blend product, the polyethylene polymer blend product comprising a blend of a virgin polyethylene and a recycled non-polar polymer, in at least one polymerization reactor, wherein the continuous polymerization process comprises:
    preparing a slurry of recycled non-polar polymer in a solvent;
    providing ethylene and, optionally, at least one $C_4$ to $C_{10}$ alpha-olefin comonomer, to a first continuous polymerization reactor in the presence of a first catalyst system;
    operating the first continuous polymerization reactor under solution polymerization conditions;
    thereby producing a first polyethylene product;
    discharging the first polyethylene product from the first continuous polymerization reactor into a second continuous polymerization reactor;
    providing ethylene and, optionally, at least one $C_4$ to $C_{10}$ alpha-olefin comonomer, to the second continuous polymerization reactor in the presence of a second catalyst system;
    operating the second continuous polymerization reactor under solution polymerization conditions;
    thereby producing a second polyethylene product;
    discharging the second polyethylene product from the second continuous polymerization reactor into a tubular reactor;
    providing the slurry of recycled non-polar polymer to the tubular reactor; and
    discharging from the tubular reactor a final polyethylene polymer blend product.

* * * * *